United States Patent [19]

Kobayashi et al.

[11] Patent Number: 4,617,900

[45] Date of Patent: Oct. 21, 1986

[54] AIR-FUEL RATIO CONTROL SYSTEM FOR AN INTERNAL COMBUSTION ENGINE HAVING A CONTROL CHARACTERISTIC VARYING WITH THE ENGINE LOAD

[75] Inventors: Hideo Kobayashi, Kawagoe; Eiji Kishida, Tokyo, both of Japan

[73] Assignee: Honda Giken Kogyo Kabushiki Kaisha, Tokyo, Japan

[21] Appl. No.: 699,281

[22] Filed: Feb. 7, 1985

[30] Foreign Application Priority Data

Feb. 15, 1984 [JP] Japan .................................. 59-027930

[51] Int. Cl.⁴ .............................................. F02M 23/04
[52] U.S. Cl. ...................................... 123/489; 123/492; 123/589
[58] Field of Search ....................... 123/339, 585–589, 123/489, 492; 60/276

[56] References Cited

U.S. PATENT DOCUMENTS

| | | | |
|---|---|---|---|
| 4,434,768 | 3/1984 | Ninomiya | 123/489 |
| 4,478,191 | 10/1984 | Kinoshita et al. | 123/589 |
| 4,478,192 | 10/1984 | Kinoshita et al. | 123/589 |
| 4,561,403 | 12/1985 | Oyama et al. | 123/489 |

Primary Examiner—William A. Cuchlinski, Jr.
Attorney, Agent, or Firm—Pollock, VandeSande & Priddy

[57] ABSTRACT

An air-fuel ratio control system for an internal combustion engine having an oxygen concentration sensor disposed in the exhaust system of the engine is provided with means for detecting a high load operation of the engine and an air-fuel ratio control signal is produced by comparing an output signal of the oxygen sensor with a first reference level corresponding to a stoichiometric value of the air-fuel ratio when the engine is operating under medium or low load condition and with a second reference level corresponding to an air-fuel ratio which is on the leaner side of the stoichiometric value when the engine is operating under the high load condition.

5 Claims, 4 Drawing Figures

AIR-FUEL RATIO CONTROL SYSTEM FOR AN INTERNAL COMBUSTION ENGINE HAVING A CONTROL CHARACTERISTIC VARYING WITH THE ENGINE LOAD

BACKGROUND OF THE INVENTION

1. Field of the Invention

The present invention relates to an air-fuel ratio control system for an internal combustion engine, and more specifically to an air-fuel ratio control system in which the control characteristics are changed depending on the engine load.

2. Description of Background Information

Internal combustion engines provided with a three-way catalytic converter in the exhaust system for the purification of the exhaust gas are sometimes equipped with an air-fuel ratio feedback control system by which the air-fuel ratio is controlled around a stoichiometric value according to the exhaust gas concentration and the operating conditions of the engine. This is because an optimum operation of the three-way catalytic converter is enabled when the air-fuel ratio of the mixture supplied to the engine is at around the stoichiometric air-fuel ratio (14.7 for example).

Generally, in the case of such air-fuel ratio control systems, an oxygen sensor is provided in the exhaust system of the engine so that whether the actual air-fuel ratio is rich or lean is detected by comparing the output signal level of the oxygen sensor with a predetermined reference level corresponding to the stoichiometric air-fuel ratio. If the result of the comparison indicates rich mixture, the air-fuel ratio of the mixture is controlled to the lean side and if the result of the comparison indicates lean mixture, the air-fuel ratio is controlled to the rich side.

In the case of internal combustion engines using a carburetor as the means for supplying the mixture into cylinders, the air-fuel ratio of the mixture supplied by means of the carburetor is controlled at around the stoichiometric value in accordance with the variation of the engine load. Specifically, when the engine load is high, the air-fuel ratio becomes richer so that the reduction of the engine output power is prevented, because high output power is required during the high load operation of the engine. On the other hand, when the engine load is medium or low, the air-fuel ratio is made lean because the fuel economy is preferred rather than the engine output power under such operating conditions of the engine.

As the air-fuel ratio control system, a control apparatus of the type of air intake side secondary air supply system is known in which an air intake side secondary air supply passage communicating with the downstream side of the throttle valve of the carburetor is provided and the air-fuel ratio control is performed by varying the amount of the secondary air flowing through the air intake side secondary supply passage. In such air-fuel ratio control systems, the air-fuel ratio becomes richer during the high load operating condition of the engine because the opening angle of the throttle valve is increased during the high load operation of the engine, and the magnitude of the vacuum on downstream side of the throttle valve is reduced, and which in turn causes the reduction of the flow of the air intake side secondary air. On the other hand, when the engine load is medium or low, the air-fuel ratio becomes leaner since the opening angle of the throttle valve is small under such an operating condition of the engine, and the magnitude of the vacuum on the downstream side of the throttle valve is increased, which in turn causes the increase of the flow of the air intake side secondary air.

In the case of the conventional fuel supply systems, it was often the case due to the above reason that the air-fuel ratio fluctuates with change in the engine load outside a normal range of the air-fuel ratio in which the operation of the three-way catalytic converter for purifying the exhaust gas is effective. Therefore, it has been required to present a system in which the air-fuel ratio of the mixture is always controlled to the stoichiometric value regardless of the change of the engine load.

SUMMARY OF THE INVENTION

An object of the present invention is therefore to provide an air-fuel ratio control system for an internal combustion engine equipped with the three-way catalytic converter and the air intake side secondary air supply system, which is capable of maintaining the air-fuel ratio under various conditions, so that the operation of purification of the exhaust gas is greatly improved.

According to the present invention, the air-fuel ratio control system is designed such that the output signal level of the oxygen sensor is compared with a first reference level corresponding to the stoichiometric value of air-fuel ratio during medium or low load operating condition of the engine, while the output signal level of the oxygen sensor is compared with a second reference level corresponding to an air-fuel ratio which is leaner than the stoichiometric value during the high load operating condition of the engine. The air-fuel ratio of the mixture to be supplied to the cylinders is controlled in accordance with the result of comparison of the output signal level of the oxygen sensor.

Further scope and applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

DETAILED DESCRIPTION OF A PREFERRED EMBODIMENT

Figure 1:
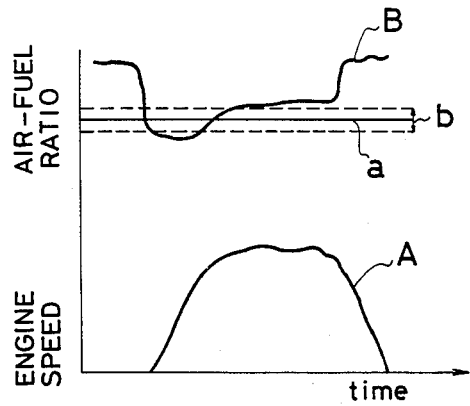
FIG. 1 is a graph showing the variation of the air-fuel ratio of the mixture controlled by a conventional air-fuel ratio control system under various operating conditions of the engine.

Before entering into the explanation of the preferred embodiment of the present invention, reference is first made to FIG. 1 in which the variation of the air-fuel ratio observed in the case of a conventional air-fuel ratio system is illustrated.

When the engine is operated through a sequential mode of acceleration, constant speed operation, and deceleration as indicated by the solid line A, the air-fuel ratio varies greatly with the change of the engine load, as indicated by the solid line B. As shown, the width of this variation is outside a range of air-fuel ratio (indicated at b) around the stoichiometric value (indicated at a) in which the operation of the three-way catalytic converter for purifying the exhaust gas is effective.

Specifically, the air-fuel ratio becomes richer than the stoichiometric value when the engine load is high, and the concentration of noxious components in the exhaust gas such as CO (Carbon Monoxide), HC (Hydro Carbon) becomes high. On the other hand, during the medium or low load operation of the engine, the concentration of NOx (Nitrogen Oxides) becomes high because the air-fuel ratio becomes leaner than the stoichiometric value under this condition. When the amount of these noxious components increases excessively, it is likely to cause increase in the amount of components which are discharged without being purified by the three-way catalytic converter.

Thus, an air-fuel ratio control system by which the air-fuel ratio is maintained at around the stoichiometric value regardless of the change in the engine load is required.

Figure 4:
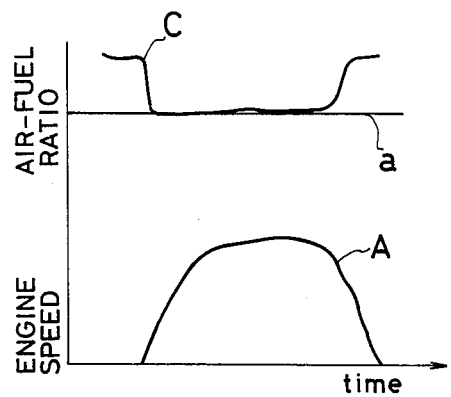
FIG. 4 is a graph similar to FIG. 1, in which the variation of the air-fuel ratio of the mixture controlled by the air-fuel ratio control system according to the present invention, under various operating conditions of the engine is illustrated.

A preferred embodiment of the present invention is explained with reference to FIGS. 2 to 4 of the accompanying drawings hereinafter.

Figure 2:
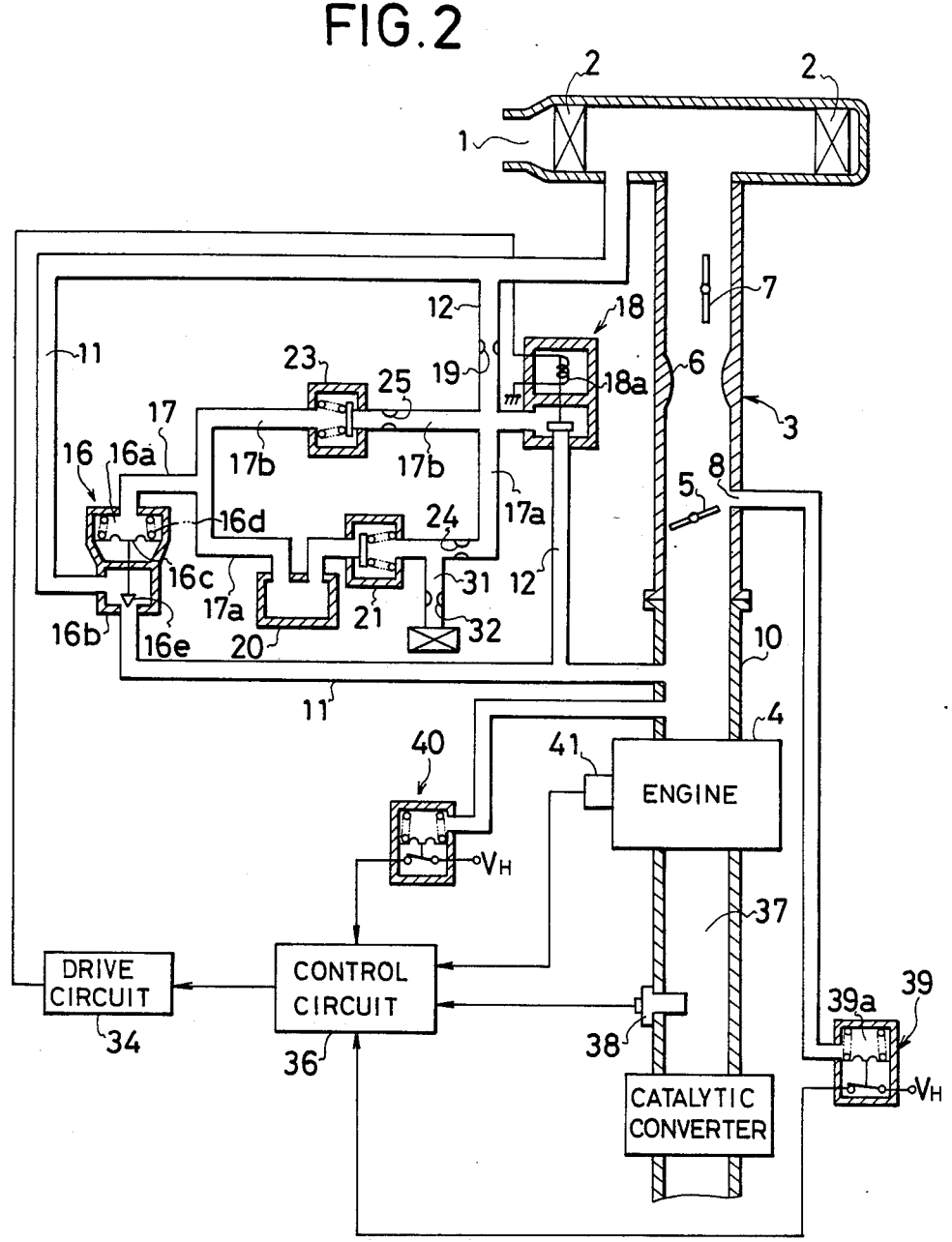
FIG. 2 is a schematic diagram illustrating the construction of an embodiment of the air intake side secondary air supply system of the present invention.

In one embodiment of the air-fuel ratio control system according to the present invention which is the air intake side secondary air supply system type and illustrated in FIG. 2, the intake air taken at an atmospheric air inlet port 1 is drawn into an internal combustion engine 4 through an air cleaner 2, and a carburetor 3. The carburetor 3 has a throttle valve 5 and a venturi 6 formed on the upstream side of the throttle valve 5. A choke valve 7 is provided on the upstream side of the venturi 6. In the bore of the carburetor, a vacuum detection hole 8 is provided adjacent to the throttle valve 5 in such a manner that it is on the upstream side of the throttle valve 5 when the latter is closed and on the downstream side of the throttle valve 5 when it is opened. Intake side secondary air supply passages 11 and 12 are provided to make a communication between the inside of the air cleaner 2 in the vicinity of an air outlet port, and an intake manifold 10, downstream of the throttle valve 5. The secondary air supply passage 11 is provided with an air control valve 16 which is made up of a vacuum chamber 16a, a valve chamber 16b, a diaphragm 16c, a valve spring 16d, and a valve element 16e having a tapered form. The air control valve 16 varies the sectional area of the secondary air supply passage 11 in accordance with the magnitude of a vacuum supplied to the vacuum chamber 16a, so that the sectional area increases with the magnitude of the vacuum.

The air intake side secondary air supply passage 12 is provided with a solenoid valve 18 having a solenoid 18a. When the solenoid 18a is deenergized, the air intake side secondary air passage 12 is closed and communication therethrough is made when the solenoid 18a is energized. An orifice 19 is provided in the air intake side secondary air supply passage 12, on the upstream side of the solenoid valve 18. In addition, the air intake side secondary air supply passages 11 and 12 may, as shown, be respectively formed as a shunt passage communicated to the intake manifold 10.

A part of the air intake side secondary air supply passage 12 between the solenoid valve 18 and the orifice 19 is communicated with the pressure chamber 16a of the air control valve 16 by way of a pressure supply passage 17. The vacuum supply passage 17 is divided into two pressure supply passages 17a and 17b. The pressure supply passage 17a is provided with a surge tank 20 and a non-return valve 21 on the side of the air intake side secondary air passage 12 from the tank 20. The non-return valve 21 is arranged so as to allow only an air flow from the vacuum chamber 16a directed to the air intake side secondary air passage 12, i.e., the vacuum directed to the vacuum chamber 16a. On the other hand, the pressure supply passage 17b is provided with a second non-return valve 23 which is arranged to allow only an air flow directed to the vacuum chamber 16a. In a part of the vacuum supply passages 17a and 17b, on the side of the air intake side secondary air passage 12 from the non-return valves 21, 23 are provided with orifices 24 and 25 respectively. In addition, an atmospheric pressure supply passage 31 with an orifice 32 is connected to the pressure supply passage 17a between the non-return valve 21 and the orifice 24.

The solenoid 18a of the solenoid valve 18 is connected to a control circuit 36 through a drive circuit 34. The control circuit 36 is further provided with an output signal of an oxygen sensor 38 which is mounted in an exhaust manifold 37 and produces an output signal having a level $VO_2$ corresponding to an oxygen concentration of an exhaust gas and which increases with the oxygen concentration. In addition to the drive circuit 34 and oxygen sensor 38, a Pc vacuum switch 39, a $P_B$ vacuum switch 40, and a rotational speed switch 41 are connected to the control circuit 36. The Pc vacuum switch 39 turns "on" when the magnitude of the vacuum Pc supplied to a vacuum chamber 39a thereof is smaller than a predetermined level P (30 mmHg for example), and supplies a high level signal having a voltage $V_H$ to the control circuit 36. Similarly, the $P_B$ vacuum switch 40 turns "on" when the magnitude of the vacuum $P_B$ within the intake manifold 10 becomes lower than a second predetermined pressure $P_2$ (300 mmHg for example), and supplies a high level signal having the voltage $V_H$ to the control circuit 36. The rotational speed switch 41 turns "on" when the engine speed is above a predetermined rotational speed (2300 r.p.m., for example) and supplies a high level signal having the voltage $V_H$ to the control circuit 36.

Figure 3:
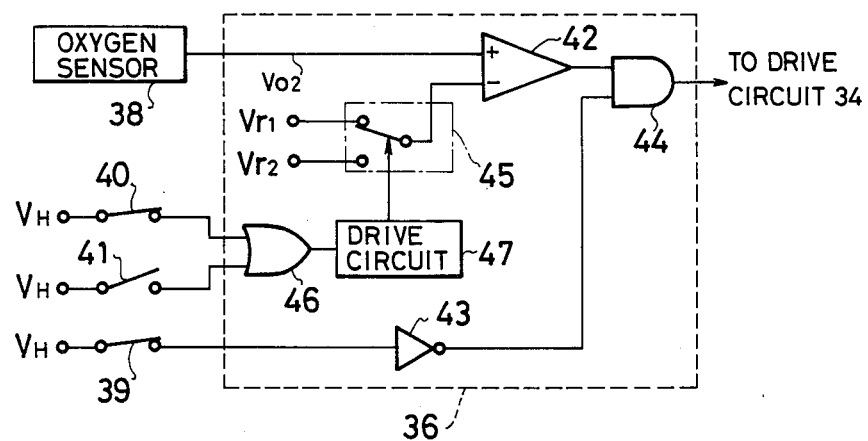
FIG. 3 is a block diagram showing the construction of the control circuit of the system shown in FIG. 2.

As shown in FIG. 3, the control circuit 36 includes a comparator 42 for comparing the output signal $VO_2$ of the oxygen sensor 38 with either one of predetermined reference voltages Vr1 and Vr2. An inverter 43 is connected to an output terminal of the $P_c$ vacuum switch 39. Output signals of the comparator 42 and the inverter 43 are applied to an AND circuit 44 in which logical AND between the input signals is calculated. The selection between the reference voltages Vr1 and Vr2 is performed by a change over switch 45 which in turn is controlled by a drive circuit 47. An OR circuit 46 receiving the output signals of the $P_B$ vacuum switch 40 and the rotational speed switch 41 is provided and an output signal thereof is applied to the drive circuit 47. When the output signal level of the OR circuit 46 is high, the change over switch 45 is operated by the drive circuit 47 so that the second reference voltage Vr2 is supplied to the comparator 42 as the reference signal.

An output signal of the AND circuit 44 is supplied to the drive circuit 34.

The operation of the air intake side secondary air supply system of the invention having the above construction will be explained hereinafter.

In the control circuit 36, when the engine is operating under medium or low load condition, both of the $P_B$ vacuum switch 40 and the rotation switch 41 turn off since the engine speed becomes lower than the predetermined rotational speed $N_1$ and the magnitude of the vacuum $P_B$ becomes higher than the predetermined vacuum level $P_2$ under these operating conditions of the engine. Therefore, the output signal level or the OR circuit 46 remains low and the reference level Vr1 is supplied to the comparator 42. The reference level Vr1 is set at a voltage corresponding to the stoichiometric value of the air-fuel ratio (0.55 V for example) which is determined according to the voltage output characteristics of the oxygen sensor 38. If the output signal level $VO_2$ of the oxygen sensor 38 is higher than the reference level Vr1 ($VO_2 \geq Vr1$), it is an indication of a rich air-fuel ratio, and the comparator 42 produces a high level output signal. If the output signal level $VO_2$ of the oxygen sensor 38 becomes lower than the reference voltage Vr1 ($VO_2 < Vr1$), it is an indication of a lean air-fuel ratio, and the comparator 42 produces a low level output signal.

In high load operation of the engine, at least either one of the $P_B$ vacuum switch 40 or the engine speed switch 41 turns "on" since the engine speed becomes higher than the predetermined rotational speed $N_1$ or the magnitude of vacuum $P_B$ becomes lower than the predetermined vacuum level $P_2$. Therefore, the output signal level of the OR circuit 46 becomes high and the drive circuit 47 actuates the change over switch 45 so that the reference voltage Vr2 is supplied to the comparator 42 through the change over switch 45. The reference voltage Vr2 is set at a voltage corresponding to an air-fuel ratio which is slightly leaner than the stoichiometric value (0.35 V for example) which is determined according to the output voltage characteristics of the oxygen sensor 38. In this state the comparator 42 produces the high level output signal when the output signal level $VO_2$ of the oxygen sensor 38 is equal to or higher than the reference voltage Vr2 ($VO_2 \geq Vr2$), and produces the low level output signal when the output signal level $VO_2$ is lower than the reference voltage Vr2 ($VO_2 < Vr2$).

During a normal operating condition of the engine, the vacuum switch 39 is in the off position. Therefore the output signal of the inverter 43 has the high level in this state. Accordingly, the output signal of the AND circuit 44 varies in the same manner as the output signal of the comparator 42 regardless of the degree of the engine load. Thus, when the output signal level of the oxygen sensor 38 is detected to be higher than the reference level Vr1 or Vr2, the output signal of the AND circuit 44 has the high level and which is in turn applied to the drive circuit 34 as the rich signal. On the other hand, if the level of the output signal of the oxygen sensor 38 is lower than the reference voltage Vr1 or Vr2, then the output signal of the AND circuit 44 has the low level and which is in turn supplied to the drive circuit 34 as the lean signal.

When the lean signal is supplied to the drive circuit 34, the solenoid 18a of the solenoid valve 18 is deenergized, thus the solenoid valve 18 is made closed. Conversely, when the rich signal is applied, the solenoid 18a is energized and the solenoid valve 18 is made open.

In response to the opening of the solenoid valve 18 from the closed state, the communication through the air intake side secondary air passage 12 is made and the secondary air is introduced into the intake manifold 10 through the orifice 19 of the air intake side secondary air supply passage 12 and the solenoid valve 18. On the other hand, vacuum $P_B$ within the intake manifold 10 is supplied to the vacuum chamber 16a through the solenoid valve 18 of the air intake side secondary air passage 12, the orifice 24 of the pressure supply passage 17a, the non-return valve 21, and the surge tank 20. Since the pressure within the vacuum chamber 16a gradually increases to reach the vacuum $P_B$ due to the effect of the residual pressures in the vacuum chamber 16a and the surge tank 20, and the effect of the orifice 24, the opening degree of the air control valve 16, that is, the sectional area of the air intake side secondary air passage 11 gradually increases. Thus, the amount of the air intake side secondary air is gradually increased. In this way, the secondary air respectively flowing through the air intake side secondary air supply passages 11 and 12 are added together and then supplied to the engine 4. Therefore, the amount of the secondary air supplied to the engine 4 gradually increases with time. In this state, since the non-return valve 23 is closed by the vacuum $P_B$, the pressure supply passage 17b is closed. The vacuum $P_B$ is diluted by the atmospheric air flowing into the air intake side secondary air supply passage 12 from the air cleaner 2 and the atmospheric pressure supply passage 31. Degree of the dilution is determined in accordance with the size of the orifices 19 and 32 and thus a fluctuation of the vacuum $P_B$ to be supplied to the pressure chamber 16a of the air control valve 16 of a large magnitude is prevented.

When, on the other hand, the solenoid valve 18 is closed from the open state, the air intake side secondary air supply passage 12 is closed immediately. Therefore, the atmospheric pressure is supplied to the vacuum chamber 16a through the orifice 19, of the air intake side secondary air supply passage 12, orifice 25 and the non-return valve 23 of the pressure supply passage 17b. Since the pressure in the vacuum chamber 16a rapidly approaches the atmospheric pressure level due to the effect of the residual vacuum in the vacuum chamber 16a and the effect of the orifices 19 and 25 while without being affected by the residual vacuum of the surge tank 20, the opening degree of the air control valve 16, that is, the sectional area of the air intake side secondary air supply passage 11 rapidly decreases to reduce the amount of the air intake side secondary air. Therefore, when the air intake side secondary air supply passage 12 is closed the secondary air is still supplied to the engine 4 through the air intake side secondary air supply passage 11 and the amount of the secondary air supply is gradually decreased with time.

When the solenoid valve 18 is closed, the non-return valve 21 is closed by the atmospheric pressure to be supplied to the vacuum chamber 16a, and in turn the pressure supply passage 17a is closed. Thus, the atmospheric pressure is supplied to the vacuum chamber 16a without passing through the surge tank 20, resulting in a high speed of the decrease of the air intake side secondary air which is by far faster than the speed of the increase thereof.

Therefore, when the feedback air-fuel ratio control is performed as above, the rich signal and the lean signal is produced alternately without interruption. Therefore, in the air intake side secondary air supply passage 11, the amount of the secondary air is increased during the presence of the rich signal, and decreased during the presence of the lean signal. Thus, the integral (I) control is performed. In the air intake side secondary air supply passage 12, the secondary air flows intermittently and the proportional (P) control takes place. Therefore, the amount of the secondary air supplied to the intake manifold becomes a sum of the proportional control and the integral control.

When, on the other hand, the operating state of the engine 4 is turned to the decelerating state as a result of the closure of the throttle valve 5, the magnitude of the vacuum Pc supplied from the vacuum detection hole 8 to the vacuum switch 39 becomes smaller than the predetermined level and a high level output signal of the vacuum switch 39 is applied to the inverter 43. As a result, the output signal level of the inverter 43 turns to the low level. In this state, the AND circuit 44 provides the low level signal to the driving circuit 34 regardless of the level of the output signal of the comparator 42, that is, the output signal level of the oxygen sensor 38. The drive circuit 34 in turn stops the operation of the solenoid valve 18 as in the case in which the lean signal is applied thereto. With the unoperated solenoid valve 18, the atmospheric pressure is continuously supplied to the vacuum chamber 16a of the air control valve 16, and the air intake side secondary air passages 11 and 12 are closed. Thus, the feedback control of the air-fuel ratio is stopped.

In the above, an embodiment of the present invention which is adapted to the air intake side secondary air supply system has been described. However, it is to be noted that the application of the present invention is not limited to the above example. As an example, the present invention can be also used for another type of air-fuel ratio control system in which the amount of the fuel to be supplied to the engine, for example the amount of the fuel supplied by the carburetor or fuel injector, is controlled.

Thus, in the case of the present invention, the detection of the air-fuel ratio is performed in such a manner that, during a medium or low load operation of the engine, the output signal level of the oxygen sensor is compared with a first predetermined reference level corresponding to the stoichiometric air-fuel ratio, and during the high load operation of the engine, the output signal level of the oxygen sensor is compared with a second predetermined reference level corresponding to an air-fuel ratio which is leaner than the stoichiometric air-fuel ratio. The direction of the air-fuel ratio control is determined in accordance with the result of the comparison process. Thus, in the case that the operation of the carburetor is set such that air-fuel ratio becomes rich when the engine is operating under high load condition, the actual airfuel ratio of the mixture can be controlled substantially at the stoichiometric air-fuel ratio since the target of the air-fuel ratio is shifted to the lean side during the high load operation of the engine. This is typically shown in the graph of FIG. 4 in which the variation of the air-fuel ratio of the mixture under various operating conditions of the engine identical with that of FIG. 1 is illustrated. As clearly shown by the solid line C, the air-fuel ratio is controlled substantially at the stoichiometric value under various operating conditions of the engine. As a result, efficiency of the purification of the exhaust gas by means of the three-way catalytic converter is improved as compared with the conventional systems.

What is claimed is:

1. In an air-fuel ratio control system for an internal combustion engine, said system operates to shift the air-fuel ratio to a rich side with respect to a stoichiometric value when an engine load is high, said system including an oxygen sensor provided in an exhaust system of the engine, a comparing means for comparing a level of an output signal of said oxygen sensor with a first reference level corresponding to the stoichimetric value of the air-fuel ratio, and an air-fuel ratio control means for controlling an air-fuel ratio of a mixture to be supplied to the engine in accordance with a result of a comparison process of said comparing means, wherein the improvement comprises a detection means for detecting a high load operation of the engine, and said comparing means comparing the level of the output signal of the oxygen sensor with a second reference level corresponding to an air-fuel ratio value on the leaner side of said stoichimetric value.

2. An air-fuel ratio control system for an internal combustion engine, said system operates to shift the air-fuel ratio to a rich side with respect to a stoichiometric value when an engine load is high, said system comprising:
    an oxygen sensor provide in the exhaust system of the engine for generating a sensor output signal;
    a detection means for detecting an engine load and producing a high load signal when a high load condition of engine operation is detected;
    a control signal generating means responsive to said oxygen sensor and said detection means, for generating an air-fuel ratio control signal by comparing said sensor output signal with a first reference level corresponding to the stoichiometric value of the air-fuel ratio when said high load signal is not present and with a second reference level corresponding to an air-fuel ratio leaner than the stoichiometric value upon presence of said load signal; and
    a control means for controlling the air-fuel ratio of a mixture supplied to the engine in accordance with said air-fuel ratio control signal.

3. An air-fuel ratio control system for an internal combustion engine comprising:
    an oxygen sensor provided in the exhaust system of the engine for generating a sensor output signal;
    a detection means for detecting an engine load and producing a high load signal when a high load condition of engine operation is detected, said detection means including an engine speed sensor for sensing a rotational speed of the engine and producing a high speed signal when the rotational speed of the engine is above a predetermined level, a $P_B$ vacuum sensor for sensing a vacuum level within an intake manifold of the engine and producing a low vacuum signal when a magnitude of the vacuum within the intake manifold of the engine is smaller than a predetermined reference vacuum value, and an OR gate means connected to said engine speed sensor and said $P_B$ vacuum sensor for producing the high load signal when at least one of said high speed signal and said low vacuum signal is present;
    a control signal generating means responsive to said oxygen sensor and said detection means, said control signal generating means generating an air-fuel ratio control signal by comparing said sensor output signal with a first reference level corresponding to a stoichometric value of the air-fuel ratio when said high load signal is not present and with a second reference level corresponding to an air-fuel ratio leaner than the stoichimetric value upon presence of said high load signal; and a control means for controlling the air-fuel ratio of a mixture supplied to the engine in accordance with said air-fuel ratio control signal.

4. An air-fuel ratio ratio control system for an internal combustion engine having a carburetor and intake air passage with a throttle valve, comprising:

an oxygen sensor provided in the exhaust system of the engine for generating a sensor output signal;

a first air intake side secondary air supply passage leading to the intake air passage on downstream side of the carburetor and the throttle valve;

an air control valve disposed in said first air intake side secondary air supply passage and adapted to vary a sectional area of the first air intake side secondary air supply passage in accordance with a magnitude of a pressure supplied to a pressure chamber thereof;

a second air intake side secondary air supply passage leading to the intake air passage on downstream side of the carburetor and the throttle valve;

an open/close valve disposed in said secodd air intake side secondary air supply passage and opening and closing same in accordance with an air-fuel ratio control signal;

a detection means for detecting an engine load and producing a high load signal when a high load condition of engine operation is detected;

a control signal generating means responsive to said oxygen sensor and said detection means, for genrating said air-fuel ratio control signal by comparing said sensor output signal with a first reference level corresponding to a stoichiometric value of the air-fuel ratio when said high load signal is not present and with a second reference level corresponding to an air-fuel ratio leaner than the stoichiometric value upon presence of said load signal.

5. An air-fuel ratio control system as set forth in claim 4, wherein said detection means comprises an engine speed sensor for sensing a rotational speed of the engine and producing a high speed signal when the rotational speed of the engine is above a predetermined level, a $P_B$ vacuum sensor for sensing a vacuum level within an intake manifold of the engine and producing a low vacuum signal when a magnitude of the vacuum within the intake manifold of the engine is smaller than a predetermined reference vacuum value, and an OR gate means connected to said engine speed sensor and said $P_B$ vacuum sensor and producing the high load signal when at least one of said high speed signal and said low vacuum signal is present.

* * * * *